United States Patent
Brandstaetter et al.

(10) Patent No.: US 7,255,547 B2
(45) Date of Patent: Aug. 14, 2007

(54) PLASTICS GRANULATING DEVICE

(75) Inventors: Johann Brandstaetter, Furth (AT); Andreas Pechhacker, Altenmarkt (AT)

(73) Assignee: Starlinger & Co Gesellschaft m.b.H., Vienna (AT)

( * ) Notice: Subject to any disclaimer, the term of this patent is extended or adjusted under 35 U.S.C. 154(b) by 0 days.

(21) Appl. No.: 11/428,512

(22) Filed: Jul. 3, 2006

(65) Prior Publication Data
US 2007/0003655 A1   Jan. 4, 2007

(30) Foreign Application Priority Data
Jul. 4, 2005   (AT)   ............... A 1119/2005

(51) Int. Cl.
*B29B 9/10* (2006.01)
(52) U.S. Cl. .............. 425/3; 425/67; 425/313
(58) Field of Classification Search ............ 425/3, 425/DIG. 33, 67, 311, 313
See application file for complete search history.

(56) References Cited
U.S. PATENT DOCUMENTS 2,605,877 A * 8/1952 Winther ................ 192/84.21
3,230,582 A * 1/1966 Hoffman et al. ............... 425/67
3,912,434 A * 10/1975 Nagahara et al. ........... 425/142

* cited by examiner

*Primary Examiner*—Robert Davis
*Assistant Examiner*—Marissa W. Chaet
(74) *Attorney, Agent, or Firm*—Workman Nydegger

(57) ABSTRACT

A device for granulating plastic melts comprises a granulating head (2) to which a perforated plate (3) provided with melt-discharge openings (10) is attached, which openings are swept by rotating knives (4). The perforated plate (3) is enclosed by a granulating housing (1) which is provided with at least one housing inlet (7) through which a cooling and transport medium (C), preferably water or air, can be supplied to the interior of the granulating housing (1), the cooling and transport medium (C) flowing with a motion component along the inner wall of the granulating housing (1) from the granulating head (2) toward a housing outlet (8) which is arranged in the end region of the granulating housing (1) opposite to the granulating head (2) and through which the cooling and transport medium (C) can be discharged along with the granules (G) produced. The rotating knives (4) are arranged in a knife holding device (6) mounted in a rotatable manner and coupled to the drive shaft (18, 18') of a motor (9) via a magnetic clutch (15), hence being driven in a contactless manner.

12 Claims, 3 Drawing Sheets

PLASTICS GRANULATING DEVICE

Figure 1:
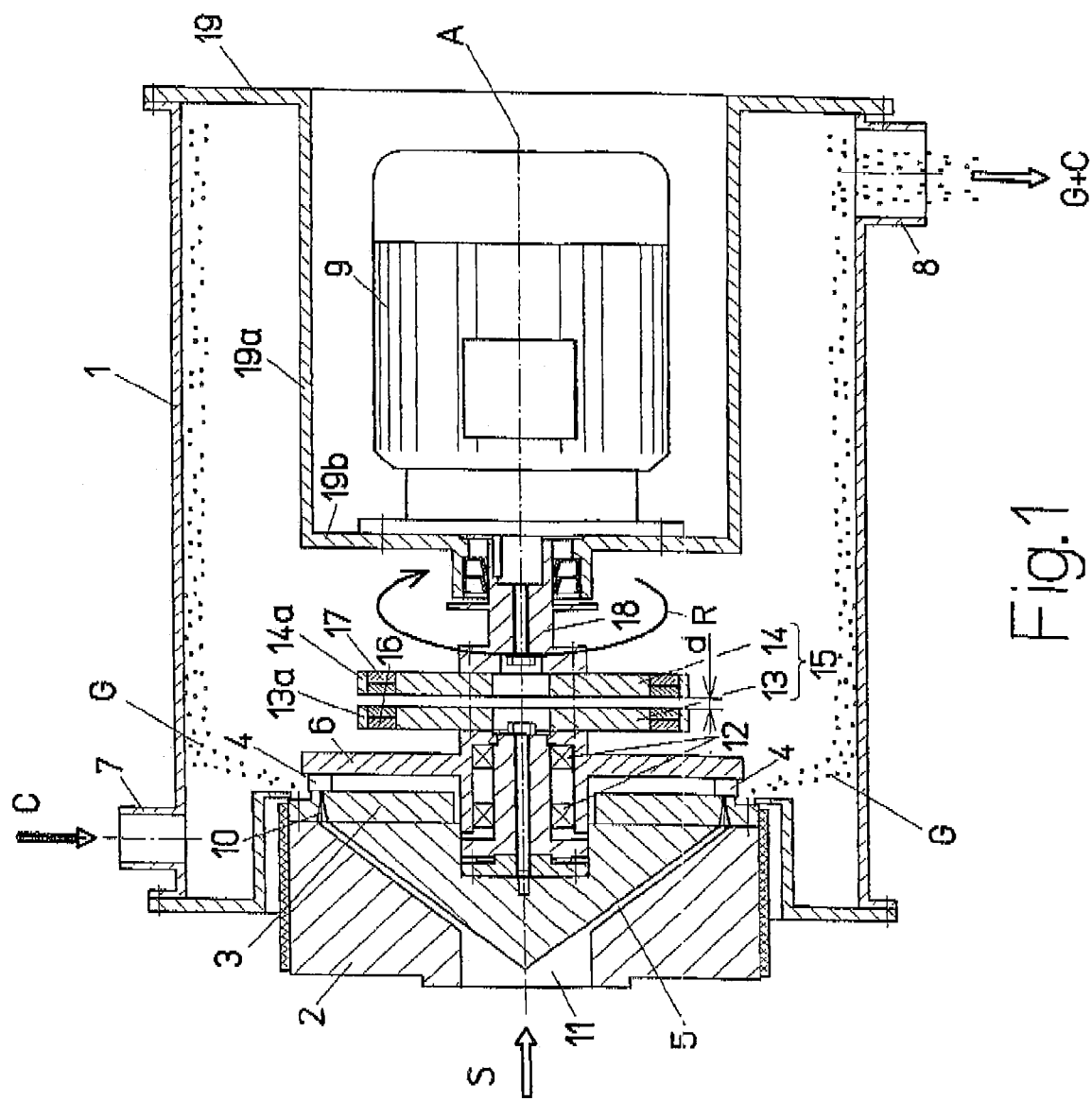

The invention relates to a device for granulating plastic melts, comprising a granulating head to which a perforated plate provided with melt-discharge openings is attached, which openings are swept by rotating knives arranged in a knife holding device mounted in a rotatable manner, with the knife holding device being driven by a motor via a drive shaft, as well as comprising a granulating housing enclosing the perforated plate, which housing is provided with at least one housing inlet through which a cooling and transport medium, preferably water or air, can be supplied to the interior of the granulating housing, the cooling and transport medium flowing with a motion component along the inner wall of the granulating housing from the granulating head toward a housing outlet which is arranged in the end region of the granulating housing opposite to the granulating head and through which the cooling and transport medium can be discharged along with granules.

Such a granulating device is known from the document AT 388 131 and serves for producing granules from a hot plastic melt, which granules are used as a starting material for the production of plastic parts by extrusion etc. In such a granulating device, granules are cut by the rotating knives from the plastic melt welling from the melt-discharge openings, which granules are flung outwards against the inner wall of the granulating housing by the centrifugal forces conferred by the rotating knives, where they enter the flow of the cooling and transport medium, thereby being cooled and subsequently discharged from the housing outlet. In order to prevent the cut off and still warm granules from being deformed, from sticking together and/or from sticking to the inner wall of the granulating housing, a cooling of the granules which is as quick as possible is necessary, for which purpose the cooling and transport medium has to be as cold as possible. This, in turn, leads to the emergence of large temperature differences within the granulating housing, which will result in different thermal expansions of the individual parts of the granulating device, which, in turn, will lead to material stresses, increased bearing loads of the knife holding device and of the drive shaft and, finally, to a reduced service life of the granulating device.

It is the object of the invention to improve a device for granulating plastic melts of the initially mentioned kind in such a way that material stresses and bearing loads of the knife holding device and of the drive shaft will be reduced and, moreover, a simplified assembly and easier replacement of the knives will be possible and, in general, maintainability of the granulating device will be improved.

The invention achieves said object by providing a granulating device having the features of claim 1. Advantageous embodiments of the invention are illustrated in the subclaims.

The device according to the invention for granulating plastic melts comprises a granulating head to which a perforated plate provided with melt-discharge openings is attached, which openings are swept by rotating knives. The perforated plate is enclosed by a granulating housing which is provided with at least one housing inlet through which a cooling and transport medium, preferably water or air, can be supplied to the interior of the granulating housing, the cooling and transport medium flowing with a motion component along the inner wall of the granulating housing from the granulating head toward a housing outlet which is arranged in the end region of the granulating housing opposite to the granulating head and through which the cooling and transport medium can be discharged along with granules. The rotating knives are arranged in a knife holding device mounted in a rotatable manner and coupled to the drive shaft of a motor via a magnetic clutch, hence being driven in a contactless manner.

The, major advantage of the contactless actuation according to the invention of the knife holder via the magnetic clutch is that, due to a distance between the coupling elements of the magnetic clutch, an axle offset or an angular position deviating from a right angle between the driving axle and the perforated plate has no effect on the movement of the knives across the melt-discharge openings. In contrast To granulating devices according to the prior art, the rotary bearing supporting the knife holding device is located in the granulating head and, thus, the knife holding device is located in a defined position relative to the perforated plate. The above-mentioned components can be assembled as a structural unit even prior to their integration in the granulating device, whereby narrow tolerances can be maintained. This produces an excellent movement of the knives across the perforated plate, which is not even adversely affected by a possible axle offset or angular offset of the drive shaft relative to the perforated plate. Rather, such deviations are absorbed by the distance between the coupling elements of the magnetic clutch. Thus, the granulating device according to the invention can also be disassembled and reassembled easily, which facilitates maintainability to a huge extent.

In a compact and highly reliable embodiment of the invention, the magnetic clutch comprises two coupling elements, one of them being connected to the drive shaft in a torque proof manner and the other one being connected to the knife holding device in a torque proof manner, wherein the two coupling elements are arranged at a distance from each other and each carry several permanent magnets which are arranged such that they face corresponding permanent magnets of the other coupling element. High torques are transmittable by means of such a coupling.

The coupling elements can be brought into a magnetic attraction already during a partial rotation of one of the coupling elements, if the permanent magnets are arranged in the coupling elements along at least one circular line.

In a very solid embodiment of the invention, the permanent magnets are arranged in through holes or blind holes of the coupling elements.

It has turned out to be advantageous for the course of the magnetic flux if adjacent permanent magnets with reversed polarity are installed in each coupling element. So as not to undesirably influence the lines of magnetic flux, it is suitable for the coupling elements to be made of a nonmagnetic material.

An excellent torque transmission between the spaced apart coupling elements is achieved if said elements are designed as disks, wheels, in the form of pots or in the form of several wings, with the permanent magnets preferably being arranged close to the circumference.

In a very compact and solid embodiment of the granulating device according to the invention, the motor projects at least partially into an area of the granulating housing which is defined between the knife holding device and the housing outlet. In this way, the overall length of the drive shaft is reduced substantially, and thus hardly any vibrations, deflections, axle offsets or angular offsets will occur.

The invention is now illustrated in further detail by way of non-limiting exemplary embodiments, with reference to the drawings.

Figure 2:
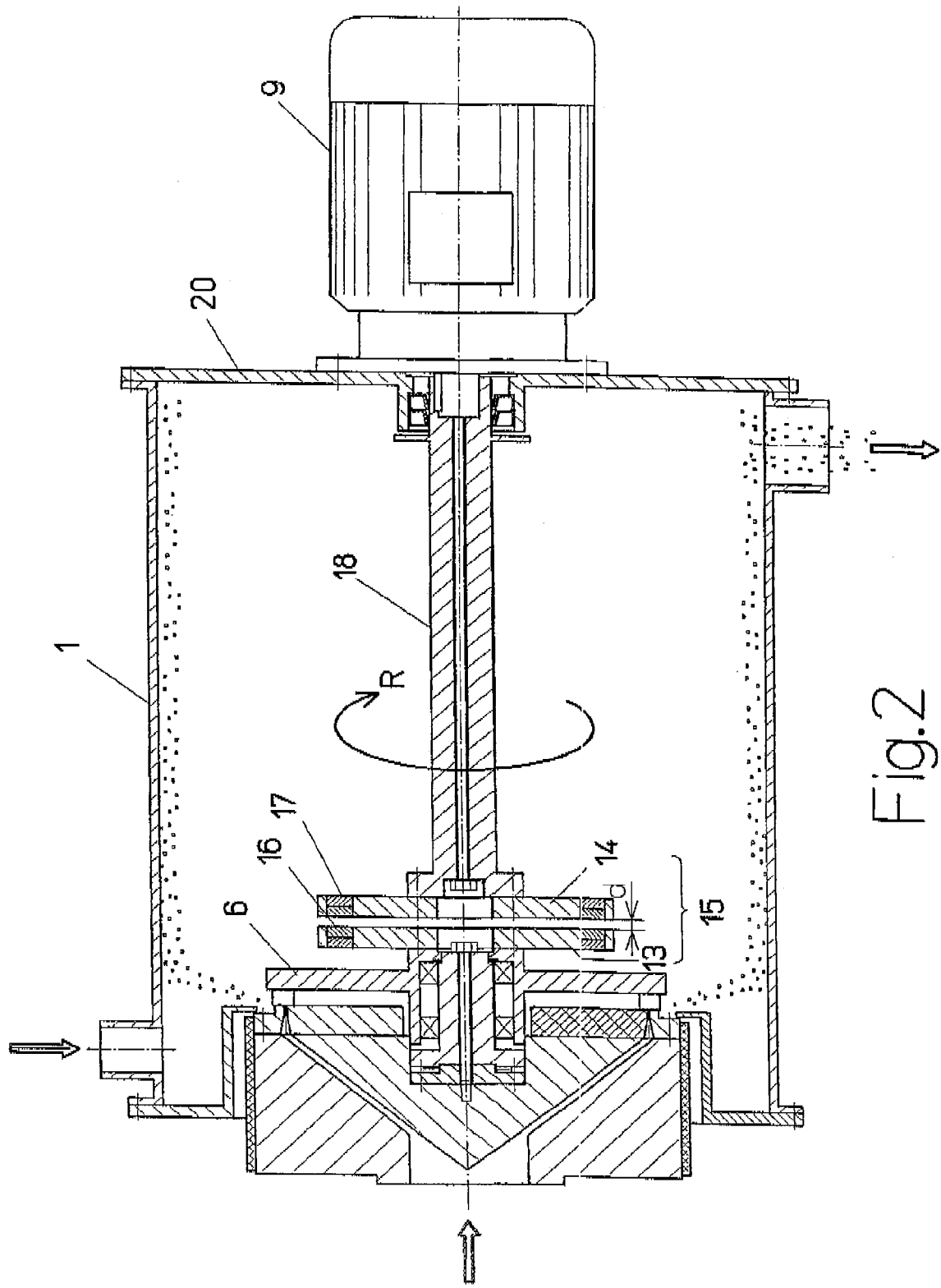
Figure 3:
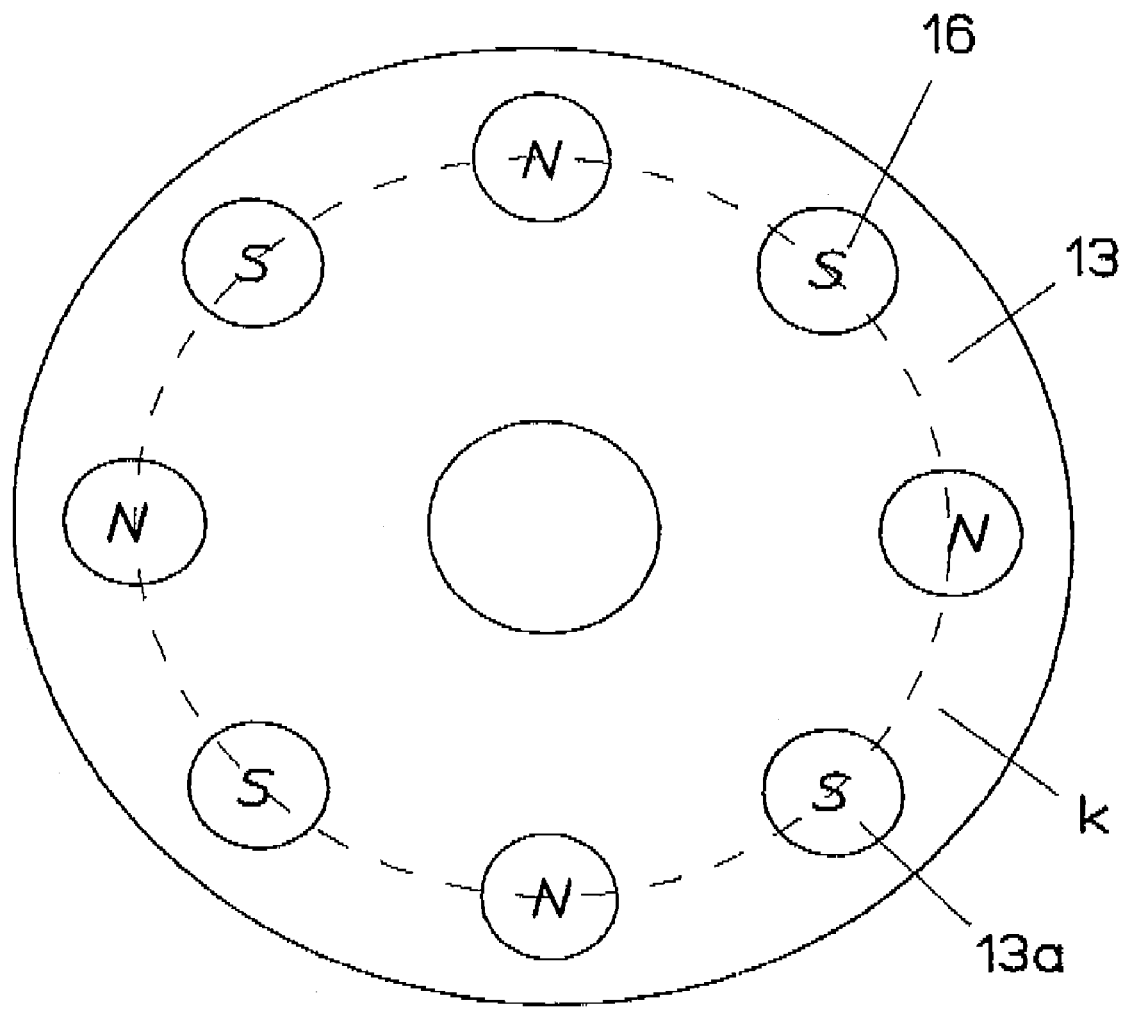

In the drawings,

FIG. 1 shows a longitudinal section of a first embodiment of a granulating device according to the invention, FIG. 2 shows a longitudinal section of a second embodiment of a granulating device according to the invention, and FIG. 3 shows a top view of a coupling element.

First with reference to FIG. 1, a first embodiment of a granulating device according to the invention is illustrated. Said embodiment comprises a granulating head 2 to which a plastic melt S is supplied via an entrance opening 11. A cone-shaped melt distributor 5 runs radially outward from the entrance opening 11 and penetrates obliquely through the granulating head 2 and, shaped as a ring, meets the surface of the granulating head 2 opposite to the entrance opening 11. A perforated plate 3 provided with a plurality of melt-discharge openings 10 aligned with the ring-shaped port of the melt distributor 5 is screwed onto the above-mentioned surface of the granulating head 2. The perforated plate 3 is enclosed by a hollow cylindrical granulating housing 1. The plastic melt S is introduced under pressure into the entrance opening 11 and is conveyed from there, through the melt distributor 5, toward the melt-discharge openings 10 and, through those, into the interior of the granulating housing. The melt-discharge openings 10 in the perforated plate 3 are swept by knives 4 which are fastened in a rotating knife holding device 6 so that the knives 4 will cut granules G from the plastic melt S. The knife holding device 6 is mounted in a rotary bearing 12. The number of knives 4, the rotational speed thereof and the number as well as the diameter of the melt-discharge openings 10 determine the shape of the granules G at a given throughput of plastic melt. Via the rotatory motion of the knives 4, a centrifugal force component is conferred to the granules G cut off by the knives 4, by means of which component said granules are flung away from the melt-discharge openings 10 toward the inner wall of the granulating housing 1. Then, the granules must be cooled and discharged from the granulating housing 1 through a housing outlet 8. A cooling and transport medium C, for example water or air, which is injected under pressure through a housing inlet 7 into the interior of the granulating housing 1, serves for this purpose. The cooling and transport medium C is injected into the interior of the granulating housing 1 at such an angle that it moves with a motion component in windings along the inner wall of the granulating housing; 1 away from the granulating head 2 toward the housing outlet 8 where it is discharged along with the granules G.

According to the invention, the knife holding device 6 is; driven in a contactless manner by being coupled to the drive shaft 18 of an electric motor 9 via a magnetic clutch 15. The magnetic clutch 15 comprises two coupling elements 13, 14, with one coupling element 14 connected to the drive shaft 18 in a torque proof manner and the other coupling element 13 connected to the knife holding device 6 in a torque proof manner, wherein the two coupling elements 13, 14 are arranged at a distance d from each other. Each coupling element 13, 14 carries permanent magnets 16, 17 fitted or glued into through holes 13a, 14a, which permanent magnets are arranged such that the permanent magnets 16 of one coupling element 13 face the permanent magnets 17 of the other coupling element 14 and, respectively, are coaxially aligned with each other so that an optimum magnetic attraction will be created. It should be mentioned that the through holes 13a, 14a can also be designed as blind holes. The permanent magnets 16, 17 are arranged in their coupling elements at regular intervals, preferably along a circular line. In order to achieve a high torque, it is suitable if the permanent magnets are arranged close to the circumference of the coupling elements. The permanent magnets 16, 17 are made of a highly magnetic material which can withstand the operating temperatures of the granulating device. The permanent magnets are designed as cylindrical bar magnets, wherein adjacent magnets with reversed polarity are inserted in the coupling elements 13, 14. In the aligned state of the coupling elements 13, 14, corresponding permanent magnets 16, 17 are arranged coaxially. The coupling elements 13, 14 consist of an essentially nonmagnetic material, such as, e.g., an aluminium alloy. If the motor 9 is activated, its drive shaft 18 rotates the attached coupling element 14 in the direction of arrow R. As soon as the permanent magnets 17 of the coupling element 14 have reached magnetic attraction with the permanent magnets 16 of the other coupling element 13, they pull the permanent magnets 16 along and thus s t the coupling element 13 into rotation, which, in turn, will rotate the knife holding device 6.

The drive shaft 18, the coupling elements 13, 14 and the knife holding device 6 are mounted essentially coaxially in an axis A. The major advantage of the contactless actuation according to the invention of the knife holding device 6 by means of the magnetic clutch 15 is that, due to the distance d between the coupling elements 13, 14 of the magnetic clutch 15, an axle offset or an angular position deviating from a right angle between the driving axle 18 and the coupling element 14 connected thereto, respectively, and the perforated plate 3 has no effect on the movement of the knives 4 across the melt-discharge openings 10. In contrast to granulating devices according to the prior art, the perforated plate 3, the rotary bearing 12 and the knife holding device 6 can be assembled as a structural unit even prior to their integration in the granulating device, whereby narrow tolerances can be maintained. The result is an excellent movement of the knives across the perforated plate 3, which can be maintained also under increased operating temperatures by appropriately designing the above-mentioned parts of the structural unit. Since said structural unit can have a very compact design, there will also be no problems caused by thermal stresses, since the temperature-induced material expansions are very small due to the short design.

Problems associated with thermal stress or material expansion are most likely to occur at the drive shaft 18 but the distance d between the coupling elements 13, 14, which generally amounts to a few millimeters, serves for absorbing possible expansions, deflections, axle offsets or angular offsets of the drive shaft during the running operation. Furthermore, it should be mentioned that the contactless actuation according to the invention of the knife holding device 6 also substantially improves the maintainability of the granulating device, since said device can be disassembled and reassembled easily. In practice, it is absolutely necessary to open the granulating device at regular intervals in order to replace or grind the knives 4. Whereas, with granulating devices according to the prior art, the assembly is always a major challenge for the maintenance personnel since very narrow tolerances have to be maintained when connecting the drive shaft with the knife holding device, in case of the present granulating device, possible deviations are absorbed by the magnetic clutch 15 so that the assembly is uncritical.

As mentioned, problems in relation to thermal expansions are most likely to occur at the drive shaft 18 which penetrates the interior of the granulating housing 1 and, with devices according to the prior art, constitutes a very long component. The present embodiment of the granulating device according to the invention exhibits another particularity which results in an extremely short structural shape of the drive shaft 18. In said embodiment, the granulating housing 1 is closed by a cover 19 having a recess 19a in its centre which projects deeply into the interior of the granulating housing 1. This does not lead to an impairment of the operation of granulation, since the granulating device is designed as an air or water-ring granulating device wherein the conveyance and cooling of the granules proceed in the form of a helix at the inner wall of the granulating housing. The motor 9 is completely accommodated in the recess 19*a* by being screwed to the base 19*b* of the recess 19*a*. The depth of the recess 19 is such that the motor 9 does not project beyond the granulating housing 1. The fact that the motor 9 is located far inside the granulating housing 1 leads to an extremely short overall length of the drive shaft 18.

In FIG. 2, a longitudinal section of a further embodiment of a granulating device according to the invention is illustrated. Said embodiment differs from the first embodiment only in that the cover 20 sealing the granulating housing 1 is designed as a flat plate which is flanged to the granulating housing 1. The motor 9 is located at the exterior of the cover 20. As can be seen in the drawing, this design results in a considerably longer driving axle 18' than in the first embodiment, which, of course, is more likely to be prone to axle offsets, angular offsets or vibrations during rotation R. However, this can also be levelled out by the distance d between the coupling elements 13, 14 without tie magnetic attraction between the permanent magnets 16, 17 deteriorating noticeably so that, also with this embodiment, the knife holding device 6 is ideally rotated by the drive shaft 18' via the magnetic clutch 15 in a contactless manner.

FIG. 3 shows a top view of a coupling element 13 which is used in the granulating device according to the invention. The permanent magnets 16 designed as cylindrical bar magnets are inserted into through holes 13 of the coupling element so that their longitudinal axis corresponding to the magnetic axis between the north and south poles will project from the drawing plane. The arrangement of the permanent magnets 16 is such that, in each case, adjacent permanent magnets with reversed polarity are inserted into the coupling element (illustrated by reference numerals N and S for north pole and south pole, respectively) Furthermore, all permanent magnets are arranged along a circular line k close to the circumference of the coupling element. It should be mentioned that the other coupling element 17 is designed in the same way. Furthermore, it should be mentioned that the shape of the coupling elements 13, 14 is not restricted to disks. Other suitable embodiments comprise a spoked wheel, with the permanent magnets suitably being arranged in the wheel ring, or a plurality of wings and arms, respectively, which project radially outward from a central hub, with the permanent magnets being arranged close to the free ends of the wings.

The invention claimed is:

1. A device for granulating plastic melts, comprising:
   a granulating head to which a perforated plate provided with melt-discharge openings is attached, the openings being configured to be swept by rotating knives arranged in a knife holding device mounted in a rotatable manner, with the knife holding device being driven by a motor via a drive shaft;
   a granulating housing enclosing the perforated plate, the housing having at least one housing inlet through which a cooling and transport medium can be supplied to the interior of the granulating housing, the cooling and transport medium flowing with a motion component along the inner wall of the granulating housing from the granulating head toward a housing outlet which is arranged in the end region of the granulating housing opposite to the granulating head and through which the cooling and transport medium can be discharged along with granules; and
   a magnetic clutch that couples the knife holding device to the drive shaft.

2. A device according to claim 1, wherein the magnetic clutch comprises two coupling elements, one of them being connected to the drive shaft in a torque proof manner and the other one being connected to the knife holding device in a torque proof manner, wherein:
   the two coupling elements are arranged at a distance from each other; and
   each of the two coupling elements carries a plurality of permanent magnets which are arranged so as to be capable of being brought into a magnetic attraction with the permanent magnets of the other coupling element.

3. A device according to claim 2, wherein the permanent magnets are arranged in the coupling elements along at least one circular line.

4. A device according to claim 2, wherein the permanent magnets are arranged in through holes or blind holes of the coupling elements.

5. A device according to claim 2, wherein the plurality of permanent magnets of each of the two coupling elements includes adjacent permanent magnets with reversed polarity.

6. A device according to claim 2, wherein the coupling elements are formed from a nonmagnetic material.

7. A device according to claim 2, wherein the coupling elements comprise disks, wheels or a plurality of wings.

8. A device according to claim 2, wherein the coupling elements are in the form of pots, with the permanent magnets being arranged close to the circumference thereof.

9. A device according to claim 2, wherein the motor projects at least partially into an area of the granulating housing which is defined between the knife holding device and the housing outlet.

10. A device according to claim 1, wherein the motor projects at least partially into an area of the granulating housing which is defined between the knife holding device and the housing outlet.

11. A device according to claim 1, wherein the cooling and transpot medium comprises water.

12. A device according to claim 1, wherein the cooling and transport medium comprises air.

* * * * *